July 26, 1938.　　　　　J. RUST ET AL　　　　　2,124,797

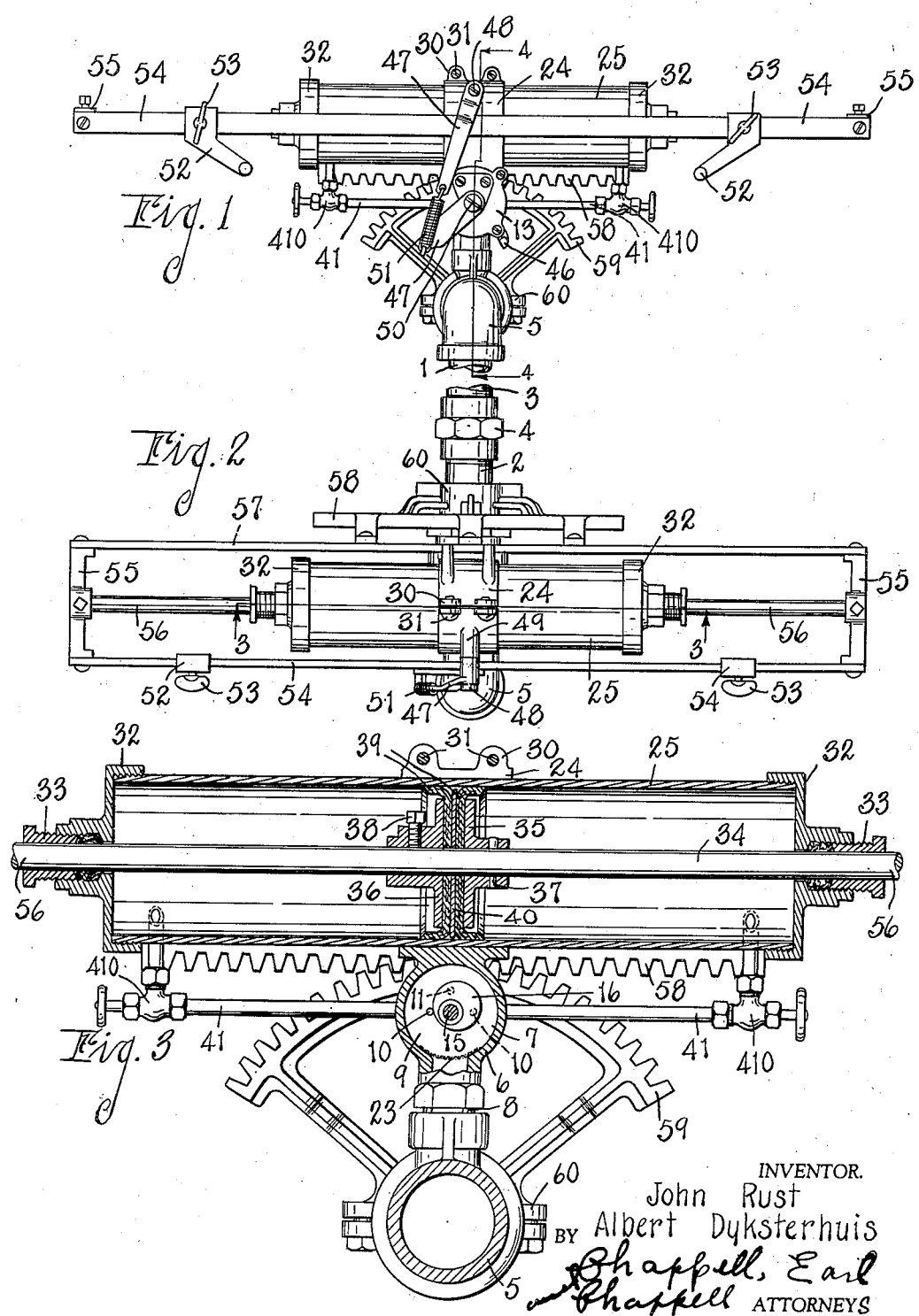

MOTOR FOR OPERATING A FLUID SPRINKLING SYSTEM

Filed Aug. 21, 1935　　　2 Sheets-Sheet 2

INVENTOR.
John Rust
BY Albert Dyksterhuis
Chappell, Earl
and Chappell ATTORNEYS

Patented July 26, 1938

2,124,797

UNITED STATES PATENT OFFICE 2,124,797

MOTOR FOR OPERATING A FLUID SPRINKLING SYSTEM

John Rust and Albert Dyksterhuis, Kalamazoo, Mich.

Application August 21, 1935, Serial No. 37,181

3 Claims. (Cl. 121—164)

The main objects of this invention are:

First, to provide an oscillating device for a sprinkler system in which the weight of the oscillating parts is minimized thereby reducing the load as much as possible.

Second, to provide an oscillating device for sprinkler systems which can be readily installed by inexperienced workmen.

Third, to provide a motor for oscillating spray pipes of sprinkling systems in which the parts are constructed and arranged for great durability and are not likely to become inoperative or clogged in use.

Fourth, to provide a structure having these advantages in which such parts as are subject to wear may be readily changed by persons not especially skilled in mechanical matters.

Fifth, to provide a structure of this type in which the stroke of the actuated element may be readily adjusted.

Objects relating to details and economies of the invention will appear from the description to follow. The invention is defined and pointed out in the claims.

A structure which is a preferred embodiment of the invention is illustrated in the accompanying drawings, in which:

Fig. 1 is a front elevation of a structure embodying the features of our invention, the riser or supply upright being broken away.

Fig. 2 is a plan view, the spray pipe being broken away.

Fig. 3 is an enlarged detail view mainly in vertical section on line 3—3 of Figs. 2 and 4.

Figure 4:
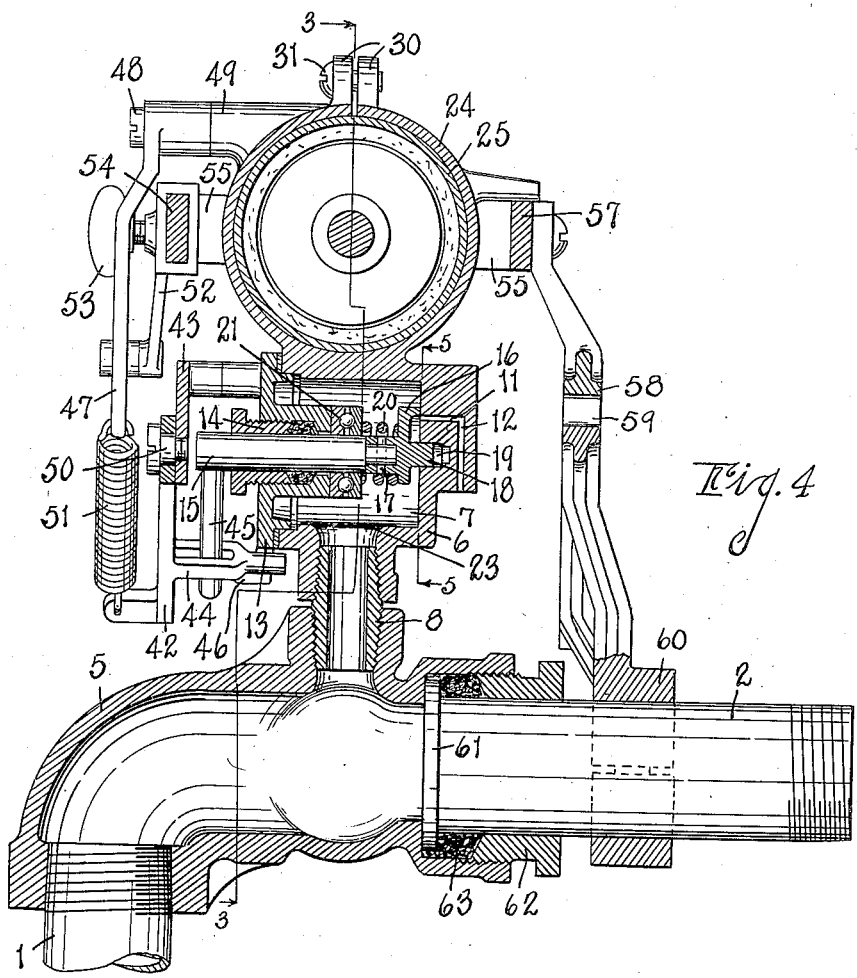
Fig. 4 is a detail view mainly in transverse section on line 4—4 of Figs. 1 and 5.
Figure 5:
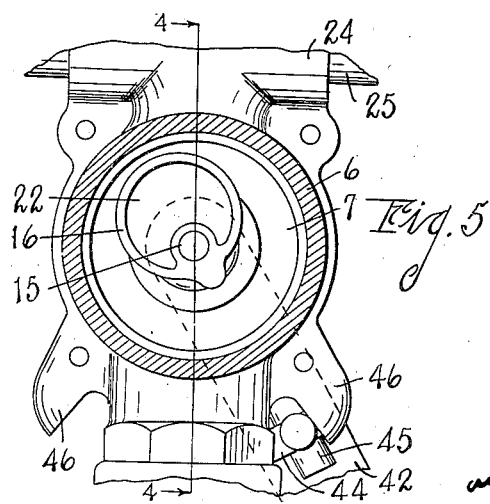
Fig. 5 is an enlarged detail view partially in section on line 5—5 of Fig. 4.

The invention relates to an oscillating device for sprinkling or spraying systems of the type in which the spray pipe is oscillated to deliver the spray. These devices are operated under conditions that are conducive to wear; that is, the water is frequently pumped from shallow wells or streams and is likely to carry a sediment which results in rapid wear of the piston and frequently in clogging of the valves and ports. One of our main objects is to provide a structure in which should wear occur, for example, on the piston, it may be readily repaired in the field by unskilled workmen, and also a structure in which the likelihood of the valve clogging is minimized and readily compensates for wear. A further object is to provide a structure in which the motor parts remain stationary so that the inertia which constitutes considerable load in oscillating motors is obviated.

Referring to the drawings, 1 represents a riser of the supply line or water trunk system and 2 the oscillated element, the spray pipe 3 being connected to this oscillated element by means of the coupling 4.

We provide an elbowed coupling 5 which constitutes a supporting bracket, this elbowed coupling being threaded upon the riser 1. Owing to the shape of this coupling or supporting bracket, it is impossible for the workmen installing the device to mount it other than intended.

The valve casing 6 having a valve chamber 7 therein is mounted upon the member 5 by means of the coupling nipple 8 so that the valve casing is connected directly with the source of water supply.

The inner wall of the valve chamber 7 constitutes a flat valve seat 9 having spaced cylinder ports 10 and an intermediate exhaust port 11 having a downwardly directed exhaust passage 12.

The valve casing is provided with a removable end wall 13 opposite its valve seat, this end wall having a packing gland 14 for the valve stem 15. The disk valve 16 is mounted on the inner end of this stem, being secured thereto by the pin 17, the valve having a journal 18 engaging a bearing recess 19 in the valve seat. The valve is urged against its seat by means of the coiled spring 20 arranged on the valve stem and supported by the thrust antifriction bearing 21 which is in turn supported by the removable valve casing member. The purpose of the spring is to urge the valve yieldingly against its seat. This valve is eccentrically mounted on the stem, as shown, and has a recess or passage 22 in its face which is adapted to connect the cylinder ports 10 alternately with the exhaust port, the cylinder ports being alternately exposed or opened to the supply of water as the valve is reciprocated. A screen 23 is provided at the inlet to the valve casing.

The valve casing has a split clamp 24 receiving the tube-like barrel 25 of the cylinder, the clamp having ears 30 receiving the screws 31 so that the clamp may be drawn tightly upon the barrel of the cylinder, holding it in position on the casing and thus supporting it from the supporting bracket or coupling member 5.

The cylinder is provided with a head 32 at each end, these heads being threaded upon the barrel which is preferably formed of a piece of brass tubing, the heads being preferably brass castings, these heads carrying packing glands 33 for the piston rod 34. The piston comprises a pair of piston head members 35 and 36 of disk form and has hubs embracing the piston rod, the head 35 being secured by means of the pin 37 while the head 36 is removably and adjustably secured as by means of set scews 38. The cupped packing members 39 preferably of leather or other suitable flexible materal are arranged in oppositely facing relation with a supporting disk 40 between them. This provides a double acting piston and one in which the packing members can be readily renewed should they become worn out or unflexible from lack of use as may occur when the device is not in use for a considerable period as during the winter. The arrangement of one of the piston head members in a fixed relation on the piston rod or securing it to the piston rod so that it can be attached only in one position prevents an unskilled workman getting the parts out of center in disassembling and reassembling for renewal.

The cylinder ports 10 are connected to opposite ends of the cylinder by means of the conduits 41, these conduits opening into the cylinder preferably adjacent to but in spaced relation from the ends of the cylinder so that a cushion is provided for the piston at the ends of its stroke. It will be understood that water is alternately supplied to and exhausted from the ends of the cylinder so that the piston is reciprocated by the water supplied to the system. The valve ports are relatively small as it is desirable that the device work with a rather slow stroke or movement. Angle valves 410 are provided, to control the quantity of water admitted to the cylinder and permit variation in the motor speed or stopping of the motor.

The valve is controlled from the movement of the piston, the mechanism we provide comprising a valve lever 42 pivotally mounted on the bracket 43 carried by the removable valve casing wall 13. This valve lever is provided with an inwardly projecting slotted arm 44 receiving the arm 45 on the stem 15. The valve casing is provided with spaced stops 46 coacting with this slotted arm limiting the stroke of the valve so that, as stated, the cylinder ports are alternately opened to the valve chamber.

The lever 42 is actuated from the actuating lever 47 which is pivoted at 48 on the boss 49 of the clamp 24, its pivot being in vertical alignment with the pivot 50 of the valve lever 42. The valve lever is connected to the actuating lever by means of the coiled spring 51 so that as the actuating lever is reciprocated, the valve lever is actuated with a snap action. The spring, it will be noted, acts to hold the valve at either end of its stroke but when the lever 47 is swung to such an extent as to bring its swinging end past the plane of the valve lever pivot, the spring acts to quickly shift the valve.

The actuating lever is actuated by the tappets 52 adjustably secured by the set screws 53 to the tappet bar 54. This tappet bar is secured at its ends to the crossheads 55 mounted on the ends of the piston rod 56. By adjusting the tappets, the timing of the valve actuation is controlled and it will be observed that one of these tappets may be adjusted without adjusting the other and this controls the stroke of the actuated member 2 which is connected to the piston rod through the rack bar 57 mounted on the opposite ends of the crossheads at opposite sides of the cylinder.

The rack bar 57 is provided with a rack 58 coacting with the toothed segment 59 provided with a hub 60 clamped upon the actuated member 2. This actuated member is swivelled in the coupling 5, the actuating member being provided with a flange or collar 61 at its inner end and being retained by the packing gland 62 and the packing indicated at 63 so that it may oscillate within the coupling or support.

With this arrangement of parts, the motor and valve are not likely to clog or become inoperative either from sediment or from standing for some time and the valve maintains an effective seating throughout a long period of time.

The structure is very simple and economical, is easily installed, and the parts subject to wear, while very durable, may be readily replaced by unskilled workmen.

We have not attempted to illustrate or describe the various embodiments of our invention as we believe this disclosure will enable those skilled in the art to embody or adapt the same as may be desired.

Having thus described our invention, what we claim as new and desire to secure by Letters Patent, is:

1. In an oscillating device for spraying systems, the combination of a valve casing having an inlet chamber with a flat valve seat at its inner end provided with spaced cylinder ports and with an intermediate exhaust port, said valve casing having a removable end wall opposite its said valve seat and a cylinder clamp at the top thereof, a valve stem rotatably mounted in said removable end wall and provided with an arm at its outer end, a disk valve on said stem coacting with said valve seat and having a journal bearing in the valve seat wall, said valve being adapted to alternately open said cylinder ports to said valve chamber and having a passage in its face adapted to alternately connect said cylinder ports with said exhaust port, a cylinder closed at both ends mounted in said clamp on said valve casing, said cylinder ports being connected to said cylinder adjacent the ends thereof, a double acting piston provided with a connecting rod projecting through both heads of the cylinder, said piston rod having crossheads at the ends thereof, a tappet bar mounted on said crossheads at one side of said cylinder, a valve lever pivotally mounted on said removable end wall of said valve casing and provided with a slotted arm receiving said arm on said valve stem, stops on said valve casing limiting the stroke of said valve lever, an actuating lever pivotally mounted on said cylinder clamp in alignment with the pivot of said valve lever and connected to said valve lever by means of a spring whereby the valve is actuated with a snap action, tappets adjustably mounted on said tappet bar to coact with said actuating lever as the tappet bar is reciprocated, a rack bar provided with a rack mounted on said crossheads oppositely of said tappet bar, and a toothed oscillatingly mounted actuated element coacting with said rack.

2. In an oscillating device for spraying systems, the combination of a valve casing having an inlet chamber with a flat valve seat at its inner end provided with spaced cylinder ports and with an intermediate exhaust port, said valve casing having a removable end wall opposite its said valve seat and a cylinder clamp at the top thereof, a valve stem rotatably mounted in said removable end wall and provided with an arm at its outer end, a disk valve on said stem coacting with said valve seat and having a journal bearing in the valve seat wall, said valve being adapted to alternately open said cylinder ports to said valve chamber and having a passage in its face adapted to alternately connect said cylinder ports with said exhaust port, a cylinder closed at both ends mounted in said clamp on said valve casing, said cylinder ports being connected to said cylinder adjacent the ends thereof, a double acting piston provided with a connecting rod projecting through both heads of the cylinder, a tappet bar mounted on said piston rod, a valve lever pivotally mounted on said removable end wall of said valve casing and provided with a slotted arm receiving said arm on said valve stem, stops limiting the stroke of said valve lever, an actuating lever operatively connected to said valve lever, tappets adjustably mounted on said tappet bar to coact with said actuating lever as the tappet bar is reciprocated, a rack bar provided with a rack mounted on said piston rod oppositely of said tappet bar, and a toothed oscillatingly mounted actuated element coacting with said rack.

3. In an oscillating device for spraying systems, the combination of a valve casing having an inlet chamber with a flat valve seat at its inner end provided with spaced cylinder ports and with an intermediate exhaust port, said valve casing having a removable end wall opposite its said valve seat and a cylinder clamp at the top thereof, a valve stem rotatably mounted in said removable end wall and provided with an arm at its outer end, a disk valve on said stem coacting with said valve seat and having a journal bearing in the valve seat wall, said valve being adapted to alternately open said cylinder ports to said valve chamber and having a passage in its face adapted to alternately connect said cylinder ports with said exhaust port, a spring mounted on said valve stem acting to urge said valve against said valve seat, there being an antifriction bearing thrust member for said spring, a cylinder closed at both ends mounted in said clamp on said valve casing, said cylinder ports being connected to said cylinder adjacent the ends thereof, a double acting piston provided with a connecting rod projecting through both heads of the cylinder, a tappet bar mounted on said piston rod, a valve lever pivotally mounted on said removable end wall of said valve casing and provided with a slotted arm receiving said arm on said valve stem, stops limiting the stroke of said valve lever, an actuating lever operatively connected to said valve lever, and tappets adjustably mounted on said tappet bar to coact with said actuating lever as the tappet bar is reciprocated.

JOHN RUST.
ALBERT DYKSTERHUIS.